INVENTOR.
FRANKLIN E. WEST, JR.

United States Patent Office 3,266,755
Patented August 16, 1966

3,266,755
AERODYNAMIC CONTROL FOR LOCKING
AIRCRAFT CANOPIES
Franklin E. West, Jr., Vienna, Va., assignor to the United
States of America as represented by the Secretary of
the Navy
Filed Oct. 20, 1964, Ser. No. 405,313
9 Claims. (Cl. 244—121)

The invention described herein may be manufactured and used by or for the Government of the United States of America for governmental purposes without the payment of any royalties thereon or therefor.

This invention relates to a device to insure locking of aircraft canopies of the type that slide forward to reach a locked position.

Aircraft canopies such as the "clam-shell" type of canopy on aircraft have been lost from the aircraft during take off. These losses have occurred because pilots have forgotten to slide the canopies forward into the lock position. The normal operation of the canopies is to slide them backwards where they may be lifted up by rotation for allowing egress from the cockpit. A pilot having entered the aircraft pulls the canopy down and then slides it forward a small distance. Often the pilot fails to slide the canopy forward enough to place it in a locked position. Consequently upon take off the air pressure exerted on the canopy slides it backwards, lifts it and rips it from the fuselage of the aircraft.

An object of this invention is to insure against the loss of aircraft canopies.

Another object of this invention is to utilize the same force tending to blow the canopy off, to place the canopy in a locked position.

Still another object of this invention is to neutralize a pilot's error in failing to lock his aircraft canopy by automatically applying a locking force to the canopy during take off.

Yet another object of the present invention is to place an outside force upon an aircraft canopy to insure its locked position yet keeping to a minimum the drag placed on the aircraft.

With these and other objects in view, as will hereinafter more fully appear, and which will be more particularly pointed out in the appended claims, reference is now made to the following description taken in connection with the accompanying drawings wherein:

Figure 1:
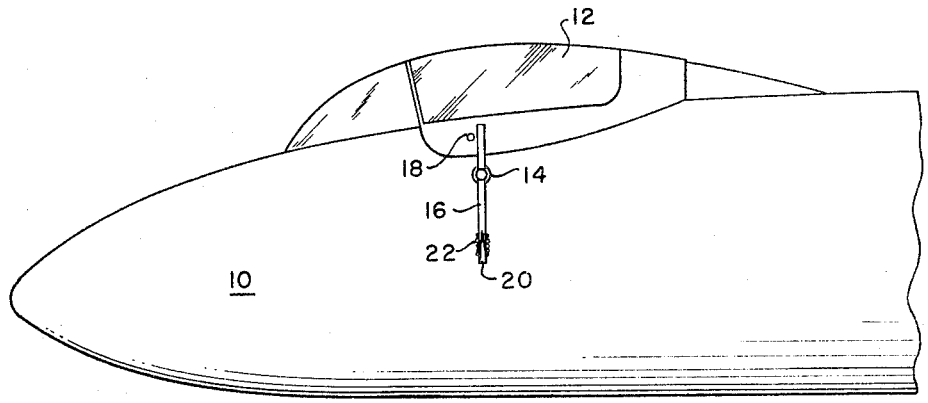
FIG. 1 shows a side view of the fuselage and cockpit of an airplane showing the device for exerting force on the canopy.

Referring now to the drawings, wherein like reference characters designate like or corresponding parts throughout the two views, there is shown in FIG. 1 an aircraft 10 having a canopy 12 closing the cockpit of the aircraft. Attached at a pivot 14 mounted on the fuselage just below the canopy 12 is a rod 16 having its greater length extending below the pivot 14 and its smaller length extending above the pivot 14. A lug 18 protruding from the canopy 12 is directly in the path of the upper portion of the rod 16 above the pivot 14. With the canopy swung down into the closed or near closed, but not locked, position, the lug is located between the rod 16 and the forward portion of the canopy 12. The lug 18 is aligned very close to the rod 16 so that a small forward rotation of the upper portion of the rod 16 causes it to engage the lug 18 to push the canopy forward to its locked position. At the bottom of the rod 16 is a spoiler 20 which is better shown in FIG. 2. The spoiler may be of any suitable form, for example, a plate, hingeably attached to the lower end of the rod.

Figure 2:
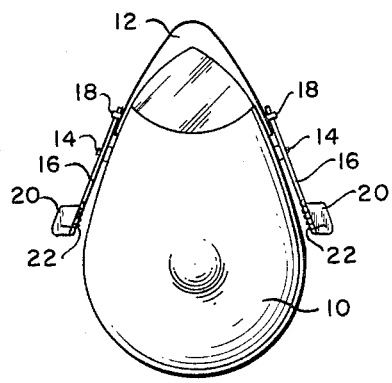
FIG. 2 shows a front or nose view of the aircraft showing spoilers which, when subjected to a slipstream, initiate the force being applied to the aircraft canopy.

FIG. 2 shows a coil spring 22 wrapped around the bottom or lower portion of the rod 16 some distance below the pivot. The top of the spring is fastened to the rod 16 while the lower end of the spring 22 is secured in any suitable manner to the spoiler 20 so that the spoiler is biased to have its flat portion opposing the slipstream. Alternatively, the spoiler 20 may be connected by torsion spring means to the rod, it may be hinged to the rod with the hinge or hinges containing springs, or the coil spring 22 may be arranged to provide both support and spring bias for the spoiler plate 20.

Within each pivot 14 there may be provided a coiled spring (not shown) mounted in a conventional manner so that without air flow the portion of each rod above the pivot will be biased to occupy a position a slight distance down stream of the canopy lugs when the canopy is in the down or closed position. This coiled spring may, for example, have one end fastened to the fuselage and its other end attached to the pivot or rod. To permit the rod to pass the canopy lug should it get in front of the lug, the lug may be either hinged for pivoting in one direction only or may be a spring biased plunger.

Operation

Assuming that the pilot has neglected to slide the cockpit into its locked position, as the airplane takes off, air pressure is exerted against the spoilers 20 located on each side of the aircraft 10. The pressure forces the rod to pivot backwards with the upper portion of the rod 16 moving forward to engage the lug 18. The force on the rod is transferred to the canopy 12 through the lug 18 forcing the canopy into a locked position.

When the force due to pressure on the spoiler 20 exceeds the force of the spring 22, the spoilers will rotate backwards streamlining themselves with the aircraft. The force on the spoilers therefore will never exceed the spring bias exerted on the spoilers by the coils 22. The spring biasing force therefore determines the maximum amount of spoiler drag force that will be placed on the aircraft.

The maximum air load on each spoiler under optimum conditions which provide locking and a minimum of drag will exceed only slightly more than one-half of the air load required to move the canopy to a locked position, and would be dependent upon the required canopy locking force and the relationship of the distance between the pivots and the top of the rods.

Though spoilers are shown on each side of the aircraft's fuselage, an alternative arrangement would be to mount a spoiler on one side of the fuselage only. A second alternative that would eliminate the drag attributed to the upper portion of the rod would be to run the upper portion of the rod above the pivot on the inside of the aircraft so that the top of the rod may bear against a protuberance on the inside of the canopy. The rod in this case would pass through the pivot and through the side of the fuselage in a manner similar to a pedal crank passing through a bicycle frame.

It should be understood that the foregoing disclosure relates to only a preferred embodiment of the invention and that numerous modifications or alterations may be made therein without the parting from the spirit and the scope of the inventon as set forth in the appended claims.

What is claimed is:
1. An aerodynamic control for locking aircraft canopies comprising:
   a lug protruding from the canopy of an aircraft;
   means movable responsive to the force of a slipstream and located on the outside of the aircraft for exerting a force on said lug to thereby place the canopy in a locked position.

2. An aerodynamic control for locking aircraft canopies as claimed in claim 1 wherein the means for placing the canopy in a locked position comprises a rod that engages the lug under the influence of the slipstream.

3. A locking device for aircraft canopies comprising:
   rod means;
   means pivotally mounting the rod means to the fuselage of an aircraft; and
   means responsive to the slipstream for forcing that portion of the rod extending above the pivot to exert a force upon the canopy.

4. A locking device for aircraft canopies as claimed in claim 3 wherein the means for placing a force on the canopy comprises a spoiler secured to the bottom of the rod.

5. A locking device for aircraft canopies as claimed in claim 3 including means resiliently mounting said spoiler, whereby said spoiler may present variable surface area to the slipstream.

6. A locking device for aircraft canopies as claimed in claim 5 wherein said resilient mounting means comprises a coil spring having its upper end secured to the rod and its lower end secured to the spoiler.

7. An automatic locking device for aircraft canopies comprising:
   a canopy;
   a rod pivotally mounted on the fuselage just below the canopy of the said aircraft;
   a lug mounted on said canopy and protruding therefrom; and
   a spoiler attached to the bottom of the said rod;
   whereby air pressure due to the action of the slipstream on the spoiler when the aircraft is taking off forces the portion of the rod above the pivot to swing into contact with the lug to force the canopy into a locked position.

8. An automatic locking device for aircraft canopies as claimed in claim 7 and further comprising a spring secured to the spoiler and to the bottom of the rod for resiliently biasing the spoiler to present a surface to the slipstream which varies according to the velocity of the slipstream.

9. An aerodynamic control for locking aircraft canopies comprising:
   a rod pivotally fastened towards its upper end to the outside of the fuselage of an aircraft;
   the portion of the rod above the pivot overlapping a closed canopy of the said aircraft;
   a lug mounted on said canopy and protruding therefrom, said lug being located in a position forward of the portion of the rod above the said pivot;
   a coil spring mounted around the bottom portion of said rod with the end of the spring nearest the pivot fastened to the rod;
   a spoiler in the form of a flat plate;
   the end of the spring farthest from the pivot being fastened to said spoiler whereby when the aircraft gains momentum and is subject to slipstream air pressure the bottom of the rod rotates rearward resulting in the top of the rod swinging forward engaging the said lug and forcing the canopy into a locked position.

No references cited.

MILTON BUCHLER, *Primary Examiner.*
A. E. CORRIGAN, *Assistant Examiner.*